US008739421B2

(12) United States Patent
Renner et al.

(10) Patent No.: US 8,739,421 B2
(45) Date of Patent: Jun. 3, 2014

(54) WALL TEXTURING TOOL

(75) Inventors: Peter S. Renner, Cedarburg, WI (US); Randall S. Belter, Green Bay, WI (US)

(73) Assignee: Template, LLC, Milwaukee, WI (US)

( * ) Notice: Subject to any disclaimer, the term of this patent is extended or adjusted under 35 U.S.C. 154(b) by 668 days.

(21) Appl. No.: 12/948,112

(22) Filed: Nov. 17, 2010

(65) Prior Publication Data

US 2011/0117277 A1 May 19, 2011

Related U.S. Application Data

(60) Provisional application No. 61/261,866, filed on Nov. 17, 2009.

(51) Int. Cl.
*G01B 3/14* (2006.01)

(52) U.S. Cl.
USPC .......... 33/563

(58) Field of Classification Search
USPC .......... 33/562–566
See application file for complete search history.

(56) References Cited

U.S. PATENT DOCUMENTS

| | | | | | |
|---|---|---|---|---|---|
| 333,459 | A | * | 12/1885 | Gibson | 428/195.1 |
| 2,059,520 | A | * | 11/1936 | Harshberger | 264/251 |
| 2,595,142 | A | * | 4/1952 | Herck | 264/31 |
| 3,137,978 | A | * | 6/1964 | Incantalupo | 451/31 |
| 3,855,924 | A | * | 12/1974 | Morse, Jr. | 101/129 |
| 4,125,658 | A | * | 11/1978 | Miles | 428/131 |
| 5,196,263 | A | | 3/1993 | Melby et al. | |
| 5,203,507 | A | | 4/1993 | Matthews | |
| 5,243,905 | A | * | 9/1993 | Webber | 101/128 |
| 5,396,713 | A | * | 3/1995 | Valdez | 33/565 |
| 5,676,999 | A | * | 10/1997 | Silva | 427/140 |
| 6,413,336 | B1 | * | 7/2002 | Likness | 156/71 |
| 7,716,893 | B1 | * | 5/2010 | King | 52/514.5 |
| 7,882,645 | B2 | * | 2/2011 | Boring | 33/562 |
| D663,769 | S | * | 7/2012 | Sward et al. | D19/40 |
| 8,349,110 | B1 | * | 1/2013 | Kochis | 156/71 |
| 2005/0229421 | A1 | * | 10/2005 | Deas et al. | 33/563 |
| 2006/0080921 | A1 | * | 4/2006 | Peterson | 52/311.1 |
| 2010/0300313 | A1 | * | 12/2010 | Disbrow | 101/128 |
| 2011/0117277 | A1 | * | 5/2011 | Renner et al. | 427/280 |

* cited by examiner

*Primary Examiner* — Yaritza Guadalupe-McCall
(74) *Attorney, Agent, or Firm* — Boyle Fredrickson, S.C.

(57) ABSTRACT

A tool and method for applying a texture material to a surface is provided. The tool comprises a body having a flat surface for mating to a smooth surface, such as a repaired portion of drywall. The body is formed of a rigid plastic material, that is optionally transparent, to enable to tool to be reused indefinitely, and has a multiplicity of spatially positioned openings disposed therethrough. Each of the openings has a predetermined configuration and position on the tool, for providing a pattern substantially matching the appearance of existing textured surface adjacent to the smooth surface. The invented method includes first affixing the tool to the smooth area of the surface, then applying a texture material to the smooth surface through the openings in the tool for forming a newly textured area that substantially matches the appearance of the existing adjacent textured surface.

8 Claims, 3 Drawing Sheets

WALL TEXTURING TOOL

CROSS-REFERENCE TO RELATED APPLICATIONS

This application claims priority from U.S. Provisional Application Ser. No. 61/261,866, filed on Nov. 17, 2009, the entirety of which is hereby expressly incorporated by reference herein.

FIELD OF THE INVENTION

The present invention relates generally to devices used to apply a material to a surface, such as an interior wall, to provide a textured appearance to the surface, and more particularly, to an improved tool and method for applying a texture to a surface that enables a user to substantially match the appearance of the newly applied texture with the appearance of an existing adjacent textured surface

BACKGROUND OF THE INVENTION

It is well known to apply a desired texture material to an exposed surface, such as gypsum wallboard, commonly referred to as sheetrock or drywall, or a plastered wall. The textured material, known as knockdown drywall, typically comprises a slurry of gypsum, suitable sands, and water that are sprayed onto the wall surface and then "knocked down," i.e. the tops of the globs flattened out using a trowel. The amount of sand and water may be altered for changing the consistency of the slurry. A thicker slurry results in rough texture on the drywall, while a thin slurry results in a somewhat smooth texture on the drywall. After the slurry is sprayed onto the drywall and knocked down or flattened using a trowel, the slurry dries to achieve the desired texture. The texture material is applied to the drywall to enhance the appearance of the wall or to hide surface imperfections.

It is a known difficulty of applying the material to drywall when there is existing texture adjacent to an area to be textured. If there is existing texture adjacent to the area to be textured, such as a repaired portion of drywall for example, it is extremely difficult to match the newly textured area to the existing texture, due the difficulty of achieving the desired viscosity of the material. It is known that it is difficult to repair a small area of a knockdown drywall wall in a fashion that matches the surrounding knockdown drywall texture unless a trained professional uses a hopper sprayer to spray material in the area that has to be repaired and knocks down the sprayed material with a trowel in a fashion that matches the surrounding texture. A process that usually requires masking off surfaces near the repair.

A prior art automated mechanism for applying a texture material, such as a texture slurry to a substrate such as drywall is disclosed in Matthews U.S. Pat. No. 5,203,507. The disclosed mechanism comprises an air powered sprayer that includes a canister assembly. A piston assembly is disposed in the canister and reciprocates along the length of the canister. An air inlet is disposed at one end of the piston canister assembly. At an opposite end, a slurry inlet and outlet device is provided. A nozzle assembly is coupled to the slurry outlet for passing of the slurry material for subsequent combination with air at the nozzle assembly. The combination of slurry material and air are then disposed on the surface to be treated. A disadvantage of the disclosed mechanism is that the process requires a relatively expensive hopper sprayer, a skilled experience person, and the masking off of adjacent surfaces.

Melby et al. U.S. Pat. No. 5,196,263 discloses a rubber article having a textured surface and a method for preparing the rubber article. The disclosed texture coating mixture is formed from a mixture of a rubber composition having a rubber component and rubber particles, substantially the same as the rubber composition employed to form the rubber article. A method of forming the rubber article is also provided which includes coating the rubber article with such a rubber texture coating mixture.

Additionally, Silva U.S. Pat. No. 5,676,999, incorporated by reference herein in its entirety, discloses a tool and method for applying a texture material to a surface that comprises a flat, rectangular paperboard body for mating to a smooth surface, such as a repaired portion of drywall. The body has a multiplicity of spatially positioned openings disposed therethrough. Each of the openings has a predetermined configuration and position on the tool, for providing a pattern substantially matching the appearance of existing textured surface adjacent to the smooth surface. The invented method includes first affixing the tool to the smooth area of the surface, then applying a texture material to the tool. The spatially positioned openings receive the material to apply the material to the smooth surface for forming a newly textured area. The spatially positioned openings in the tool enable a user to substantially match the appearance of the newly textured area, with the appearance of the existing adjacent textured surface. After the material is applied to the tool, the tool is removed and a trowel is lightly drawn across the newly textured area, until the appearance of the newly textured area closely matches the appearance of the textured surface.

Although the devices disclosed in the above prior art references have improved features, they fall to disclose all of the advantageous features achieved by the present invention.

There, therefore exists a need for an improved tool and method for applying a texture material to a surface that is easy to use, reusable and enables a user to substantially match the appearance of the newly applied texture with the appearance of an existing adjacent textured surface.

SUMMARY OF THE INVENTION

These and other aspects and advantages of the present invention are achieved by providing an improved tool and method for applying a texture material to a smooth, e.g., a repaired surface. The tool and method enables a user to substantially match the appearance of newly applied texture to the appearance of the existing texture adjacent the repaired surface. The tool of the present invention is well suited for applying texture material to a relatively small area, such as a repaired portion of drywall, for example.

According to one aspect of the invention, the tool comprises a flat, rectangular body formed of a liquid-impervious material, such as a plastic material, for mating to the smooth surface. The use of this liquid-impervious material enables the tool to be unaffected by the texture material utilized with the tool, such that the tool can effectively be cleaned and reused indefinitely.

According to a further aspect of the invention, the tool is formed of a plastic material that is transparent to enable an individual utilizing the tool to see the surface to be textured through the tool. This allows the individual using the tool to ensure that the tool is properly positioned over the portion of the surface to be textured.

According to another aspect of the invention, the body has a multiplicity of spatially positioned openings disposed therethrough. Each of the openings has a predetermined configuration and position on the body such that when the texture material is applied to the tool, a predetermined amount is disposed through the openings in the tool and onto the smooth drywall in a predetermined pattern to form a newly textured area on the drywall. The openings formed in the tool can have different predetermined shapes and dimensions for enabling a predetermined amount of the material to be disposed therethrough and onto the drywall in a desired pattern. Thus, the openings in the embodiments of the invented tool enable texture that is newly applied to the drywall, through the tool, to form a pattern on the drywall that substantially matches the appearance of existing texture adjacent to the newly textured area.

According to still another aspect of the invention, the tool has a preferred thickness that serves to inhibit an excessive amount of the material from being applied to the drywall.

According to still a further aspect of the present invention, in a method of applying the texture material to a smooth area using the tool, such as a repaired portion of drywall surrounded by existing texture, first an embodiment of the tool that most closely matches the appearance of the existing texture on the drywall is selected. The tool is then affixed to the smooth area while viewing the surface to ensure proper positioning of the tool on the surface. A suitable means for affixing the tool to the drywall may be masking tape, for example. The texture material is then applied over the tool. A preferable quantity of the material, would be sufficient to fill the openings, without the material extending out of the openings and substantially covering the tool. The invented tool is then removed from the surface to reveal a newly textured area, with the appearance of the newly textured area matching the appearance of the existing and surrounding texture. A trowel, if desired, is then drawn across the newly textured area until the appearance of the newly textured area closely matches the appearance of the textured surface. After the newly textured area is dry, paint may then be applied to the newly textured area, to sufficiently match the existing finish on the adjacent textured surface.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
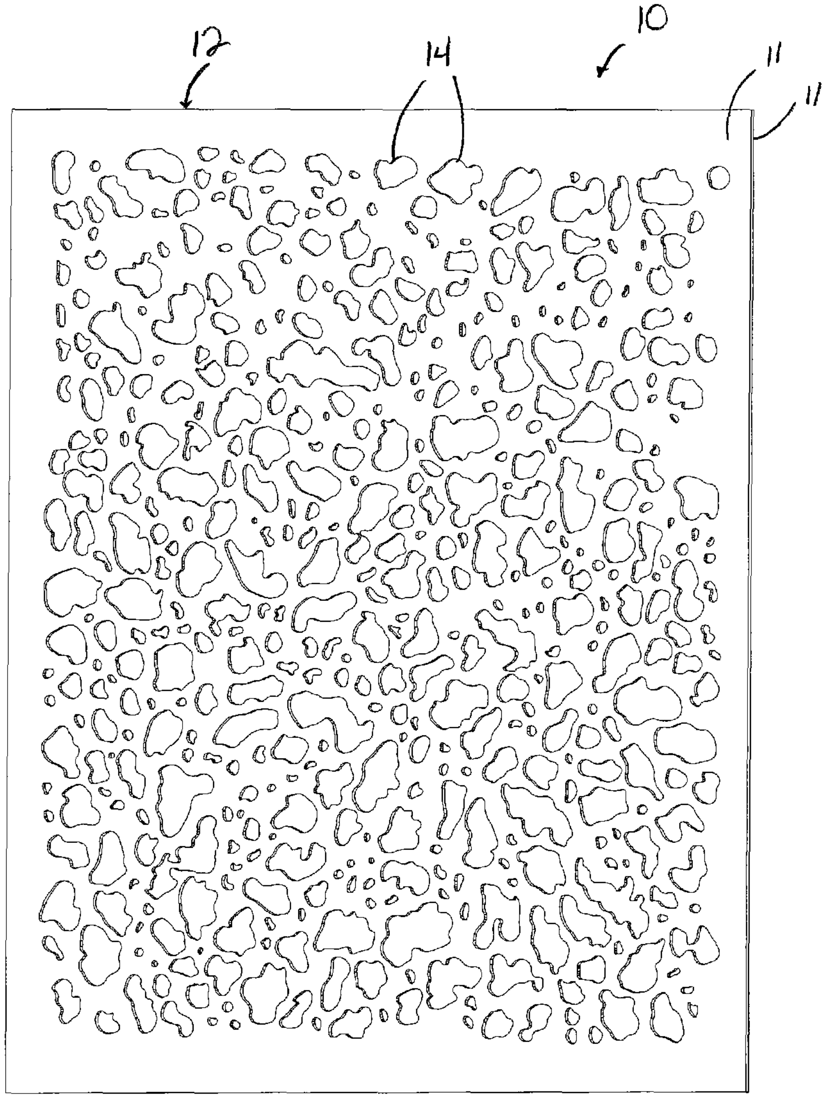
FIG. 1 is an isometric view of a first embodiment of a wall texturing tool constructed according to the present invention.

With reference now to the drawing figures in which like reference numerals designate like parts throughout the disclosure, in FIG. 1 there is shown an embodiment of a tool 10 for applying a texture material to a smooth portion of a textured surface (both not shown), such as a knock-down drywall surface, among other similar surfaces. The tool 10 comprises a body 12 having at least one, and preferably two opposed flat surfaces 11 for mating to a smooth surface, such as a repaired portion of sheetrock or drywall. The tool 10 is preferably rectangular in shape, but can have any desired shape in order to effectively cover areas of varying configurations on the surfaces to be textured. In one rectangular embodiment, the tool 10 is approximately eleven (11) inches long and approximately eight and one half (8.5) inches wide, and can range in thickness from approximately twenty (20) to approximately twenty-six (26) thousandths of an inch thick.

As opposed to prior tools that are formed from biodegradable materials, the tool 10 is fabricated from a fluid-impervious material, such as a plastic material. The plastic material used to form the tool 10 can be any suitable plastic material utilized for forming a rigid body 12 for the tool 10, as these materials prevent the tool 10 from becoming degraded as a result of contact with the texture material, which includes sufficient moisture to render prior art tools inoperable after one or a small number of uses. By using fluid-impervious plastic materials, the texture material cannot detrimentally affect the structure of the tool 10, such that the tool 10 can readily be cleaned off after use and reused an indefinite number of times for separate texturing applications. In addition, the particular plastic material used for the body 12 of the tool 10 is preferably selected to be a plastic that is transparent to enable the individual utilizing the tool 10 to view the surface to which the texture material is being applied.

Figure 2:
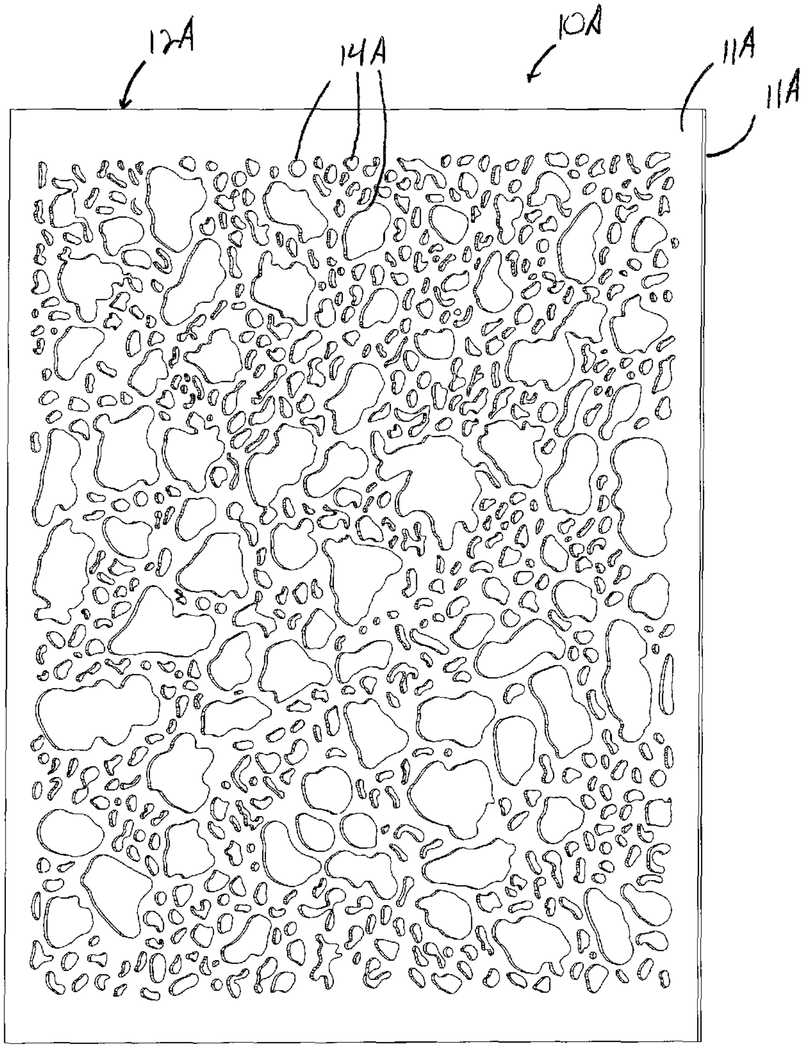
FIG. 2 is an isometric view of a second embodiment of a wall texturing tool constructed according to the present invention.
Figure 3:
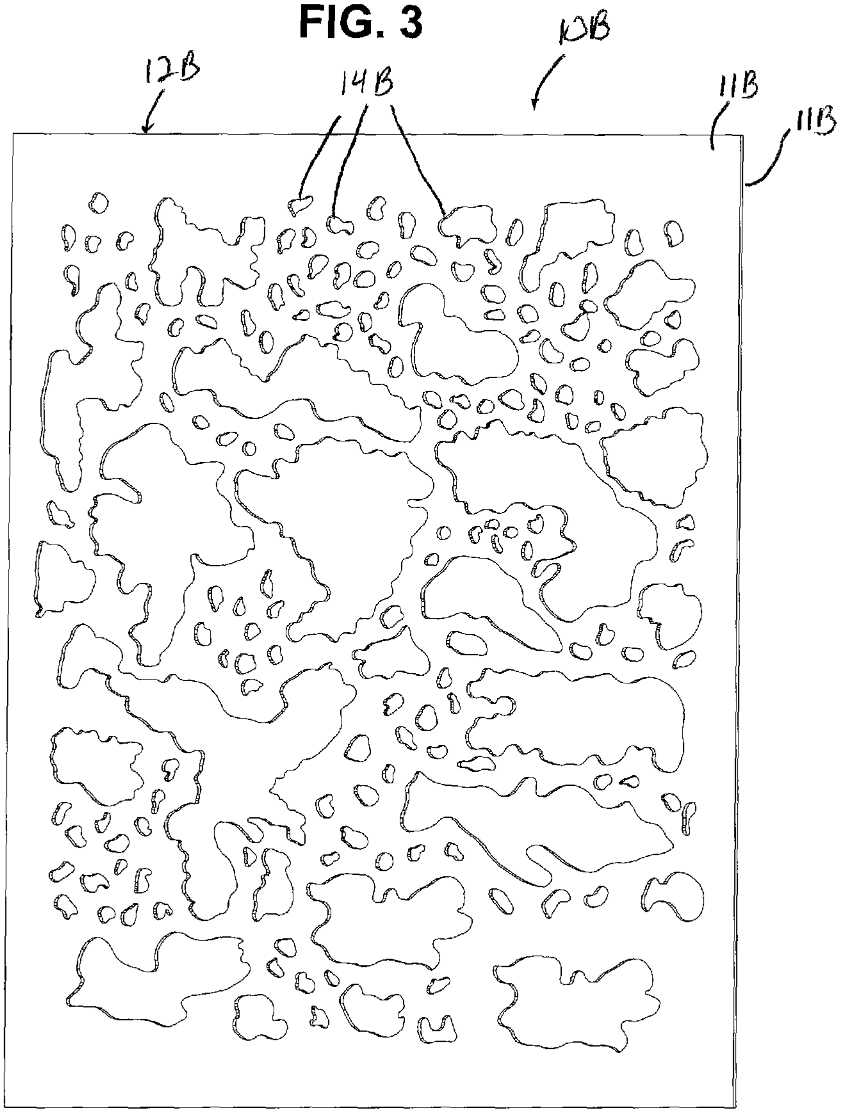
FIG. 3 is an isometric view of a third embodiment of a wall texturing tool constructed according to the present invention.

Referring now to FIGS. 1-3, alternative embodiments of the invented tool 10, 10A, 10B, respectively, are shown. In each of the alternative embodiments 10, 10A, 10B, the body 12, 12A, 12B with surfaces 11, 11A, 11B, has openings 14, 14A, 14B, each with any desired configuration, such as different predetermined anomalous peripheries and dimensions. The configuration, dimensions, and positioning of the openings 14, 14A, 14B, is selected or determined to approximate the desired appearance of the textured surface, such as a fine texture (FIG. 1), a medium texture (FIG. 2), or a coarse or heavy texture (FIG. 3). These embodiments of the invented tool 10, 10A, 10B, provide different texture patterns that substantially match the appearance of an existing textured area (not shown) adjacent to the repaired area.

In addition, without affecting the transparency of the body 12, 12A, 12B, the plastic material utilized to form the body 12, 12A, 12B can be colored on order to distinguish different tools 10 from one another. For example, in a kit (not shown) including various embodiments of the tool 10, 10A, 10B, the different tools 10, 10A, 10B can be differently colored in order to enable an individual to more readily distinguish the tools 10, 10A, 10B from each other.

To use the tool 10 of the present invention, an area to be textured, such as a smooth portion of repaired drywall, is located. The adjacent existing textured area is then surveyed, and the appropriate embodiment of the invented tool 10, 10A, 10B, that most closely matches the appearance of the existing texture is selected. The tool 10 is affixed to the drywall using known means, such as masking tape for example, which will not harm the tool 10 or drywall.

A texture material is then provided that may comprise desired quantities of gypsum and water, for example. Using the invented tool 10, a texture material of moderate consistency may be used to match existing texture of various consistencies.

The material is then disposed on the surface over the tool 10, with an appropriate hand tool such as a trowel or joint knife. A sufficient quantity of the material is disposed over the tool 10, such that the material fills the openings 14 in the tool

10 without the material extending out of the openings 14 and substantially covering the tool 10. The preferred thickness of the invented tool 10 inhibits an excessive, or insufficient, amount of texture material from being applied to the surface.

The tool 10 is then removed from the surface to expose a newly textured area formed adjacent to the existing textured surface. If the newly textured area does not sufficiently match the existing textured surface, the trowel may be lightly drawn across the newly textured area until the appearance of the newly textured area closely matches the appearance of the textured surface. After the newly textured area is dry, paint may then be applied to the newly textured area, to sufficiently match the existing finish on the adjacent textured surface.

Various other embodiments of the present invention are contemplated as being within the scope of the filed claims particularly pointing out and distinctly claiming the subject matter regarded as the invention.

We claim:

1. A tool for applying a texture material to surface to form a textured surface, the tool comprising a body having a thickness and at least one flat surface for mating to said smooth portion, said body including a number of spatially positioned openings disposed therethrough, each of said openings configured and positioned on said body, such that when the texture material is applied to said tool, a sufficient amount of the texture material is disposed through the openings in said tool and onto the surface in a pattern to form a newly textured area on the surface having an appearance substantially similar to the appearance of an adjacent portion of the surface, the amount of texture material disposed through the openings determined by the configuration of the openings and the thickness of the body, wherein the tool is transparent.

2. The tool of claim 1 wherein each of said openings has a different irregular periphery and is dimensioned for enabling a sufficient amount of the texture material to be disposed therethrough and onto said surface in a pattern to form a newly textured area having an appearance on the surface substantially similar to the appearance of the adjacent portion of the surface.

3. The tool of claim 1 wherein said tool comprises a substantially rigid plastic material.

4. The tool of claim 1 wherein the tool has a thickness of between about 0.020 inches to about 0.026 inches.

5. The tool of claim 1 wherein the tool is generally rectangular in shape.

6. A set of wall texturing tools comprising:

a) a first tool for applying a texture material to surface to form a textured surface, the first tool comprising a body having a thickness and at least one flat surface for mating to said smooth portion, said body including a number of spatially positioned openings disposed therethrough; and b) a second tool for applying a texture material to surface to form a textured surface, the second tool comprising a body having a thickness and at least one flat surface for mating to said smooth portion, said body including a number of spatially positioned openings disposed therethrough that are different in size and shape than the openings in the first tool.

7. The set of wall texturing tools of claim 6 wherein the first tool is a different color than the second tool.

8. The set of wall texturing tools of claim 7 wherein the first and second tools are transparent.

* * * * *